(12) United States Patent
De Vaan

(10) Patent No.: US 6,450,649 B2
(45) Date of Patent: Sep. 17, 2002

(54) COLOR PROJECTION SYSTEM

(75) Inventor: Adrianus Johannes Stephanes Maria De Vaan, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 24 days.

(21) Appl. No.: 09/746,105

(22) Filed: Dec. 22, 2000

(30) Foreign Application Priority Data

Dec. 24, 1999 (EP) .............................. 99204542

(51) Int. Cl.⁷ ..................... G03B 21/14; G03B 21/00; H04N 9/12
(52) U.S. Cl. .................. 353/84; 348/743; 353/31
(58) Field of Search ................... 353/51, 20, 84, 353/31, 38; 359/9; 348/743, 742

(56) References Cited

U.S. PATENT DOCUMENTS 6,217,174 B1 * 4/2001 Knox .......................... 353/31
6,266,105 B1 * 7/2001 Gleckman .................... 348/743
6,334,685 B1 * 1/2002 Slobodin ...................... 353/31

* cited by examiner

Primary Examiner—Russell Adams
Assistant Examiner—Andrew Sever

(57) ABSTRACT

A color projection system includes a light source, a rotatable drum having a plurality of differently Colored bands, and a light modulation panel on which light beams reflected by the colored bands can be directed by way of scrolling. The apparatus directs the light beam from the light source onto a first group of juxtaposed bands. The light beam on each band is split and reflected into light beams having complementary colors and different directions of polarization. Light beams having a first direction of polarization are directed onto the light modulation panel, and light beams having a second direction of polarization are reflected onto a second rope of bands of the drum. The second group of bands is shifted by at least one band with respect to the first group of bands.

21 Claims, 3 Drawing Sheets

COLOR PROJECTION SYSTEM

FIELD OF TECHNOLOGY

The invention relates to a color projection system comprising a light source, a rotatable drum having a plurality of differently colored bands, and a light modulation panel on which light beams reflected by the colored bands can be directed by way of scrolling.

BACKGROUND AND SUMMARY OF THE INVENTION

In such a color projection system as described in non-prepublished European patent application EP 99202414.1, the light beam coming from the light source is directed onto the drum and split by the differently colored bands into light beams having complementary colors, while a light beam colored in conformity with a color of the band is directed onto the light modulation panel. The complementary color is absorbed by the band. This means that when using split colors of red, green and blue, one color of a light beam projected on a band is directed onto the light modulation panel, whereas the other two colors are absorbed. This results in a two-thirds loss of light.

It is an object of the invention to provide a color projection system in which there is less loss of light.

In the color projection system according to the invention, this object is achieved in that the color projection system further comprises means for directing the light beam from the light source onto a first plurality of juxtaposed bands, means for splitting and reflecting the light beam on each band into light beams having complementary colors and different directions of polarization, means for directing light beams having a first direction of polarization onto the light modulation panel, and means for reflecting light beams having a second direction of polarization onto a second plurality of bands of the drum which is shifted by at least one band with respect to the first plurality of bands.

Instead of absorbing the color(s) complementary to the colored band, these colors are reflected and subsequently reflected again into the direction of the drum, while the colors reach another band. This band has the same color as one of the colors reflected again so that this band as yet directs the relevant color onto the light modulation panel. In this way, a larger part of the light beam coming from the light source is directed onto the light modulation panel.

These and other aspects of the invention are apparent from and will be elucidated with reference to the embodiments described hereinafter.

BRIEF DESCRIPTION OF THE DRAWINGS

In the drawings.

Corresponding components in the Figures have the same reference numerals.

DESCRIPTION OF THE PREFERRED EMBODIMENTS

Figure 1:
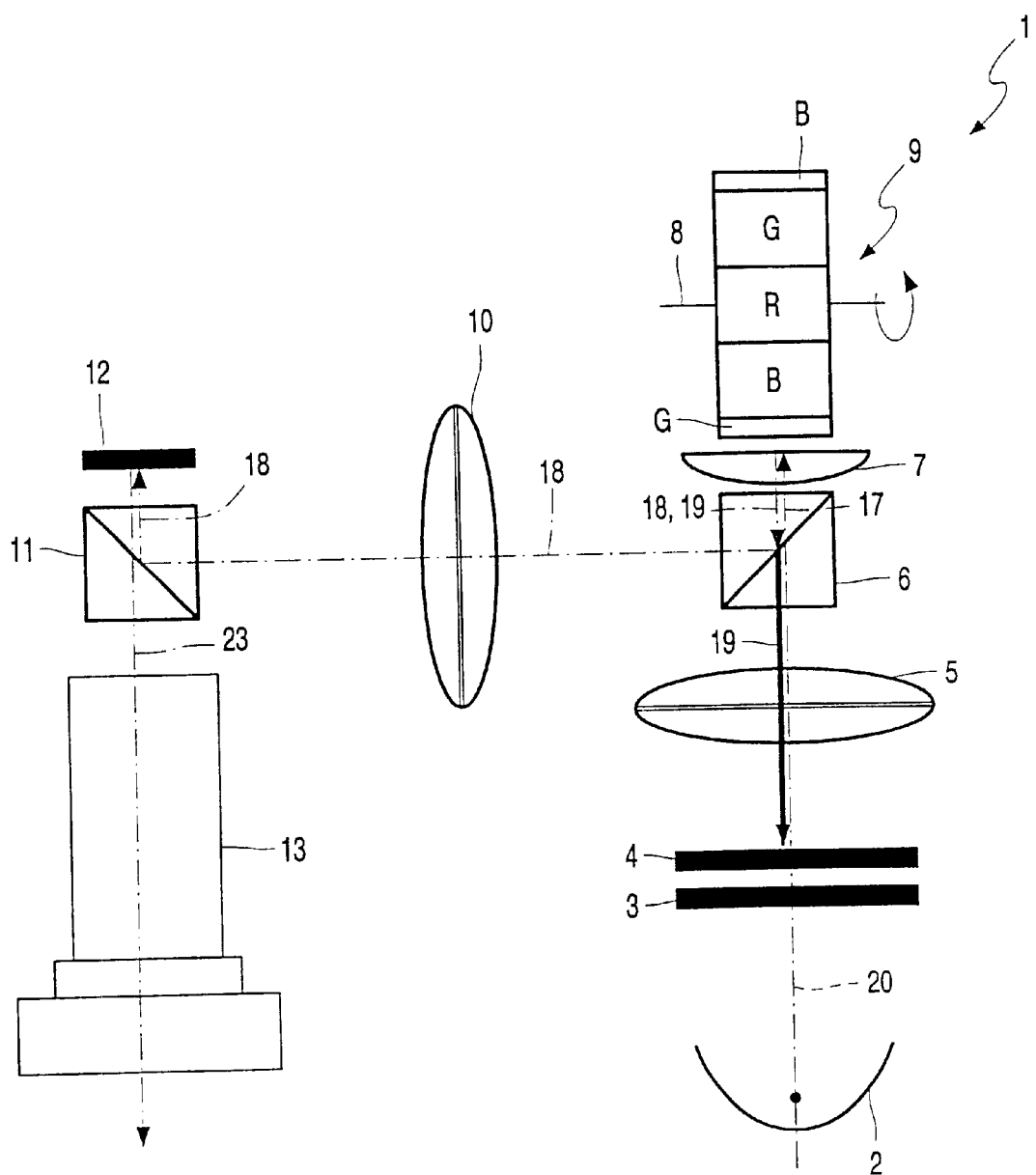
FIG. 1 is a diagrammatic elevational view of a device according to the invention.

FIG. 1 shows a color projection system 1 according to the invention, comprising a light source 2, first and second integrator plates 3, 4 preceding the light source 2, a lens 5 preceding the integrator plates 3, 4, a polarized beam splitter (PBS) 6 preceding the lens 5, a lens 7 located opposite one side of the PBS 6, a drum 9 rotatable about a shaft 8 and located at a side of the lens 7 remote from the PBS 6, a lens 10 located opposite another side of the PBS 6, a second polarized beam splitter (PBS) 11 preceding the lens 10, a light modulation panel 12 located opposite one side of the PBS 11, and a projection lens 13 located opposite another side of the PBS 11.

The second integrator plate 4 is provided with a plurality of juxtaposed lenses and interpositioned reflecting surfaces facing the drum 9. Such an integrator plate is known from EP-A-0 902 907 in the name of the applicant.

Figure 2:
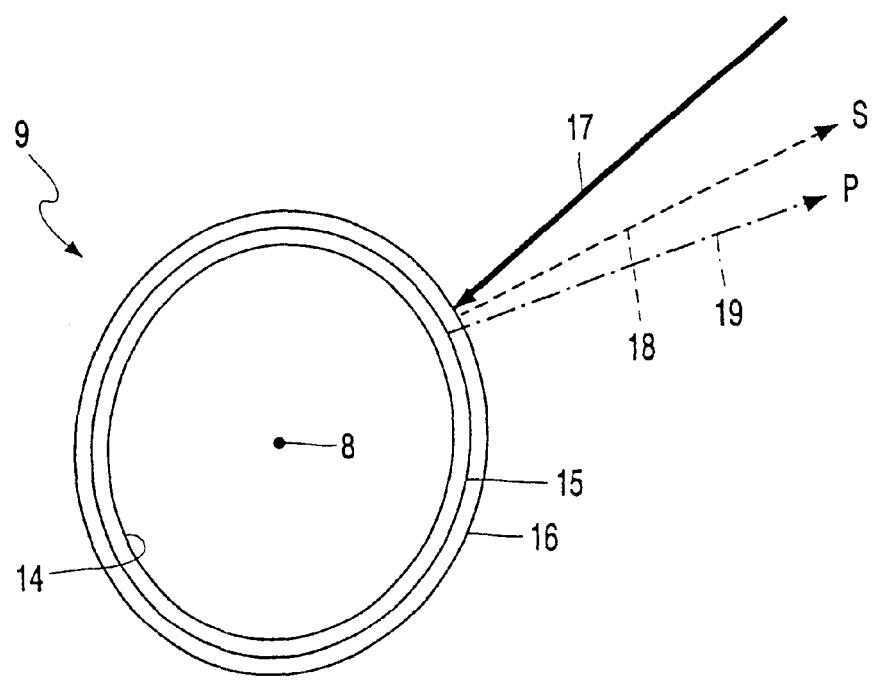
FIG. 2 is a cross-section of a drum of the device shown in FIG. 1, FIGS. 3A–3C show color bands directed onto the drum and the light modulation panel in a first embodiment of the drum.

FIG. 2 is a cross-section of the drum 9. Drum 9 has a reflecting coating 14 provided with a ¼λ foil 15 and a dichroic layer 16. The dichroic layer 16 is divided into a plurality of axially extending bands of different colors. A light beam 17 directed onto the dichroic layer 16 is split by the dichroic layer 16 and the ¼λ foil 15 and reflected in a light beam 18 having a color which corresponds to the color of the dichroic layer 16 and has a first direction of polarization S, and a light beam 19 having a color which is complementary to the color of the dichroic layer 16 and has a second direction of polarization P.

The operation of the device 1 will now be elucidated with reference to FIGS. 3–5.

Figures 3A, 3B, 3C:
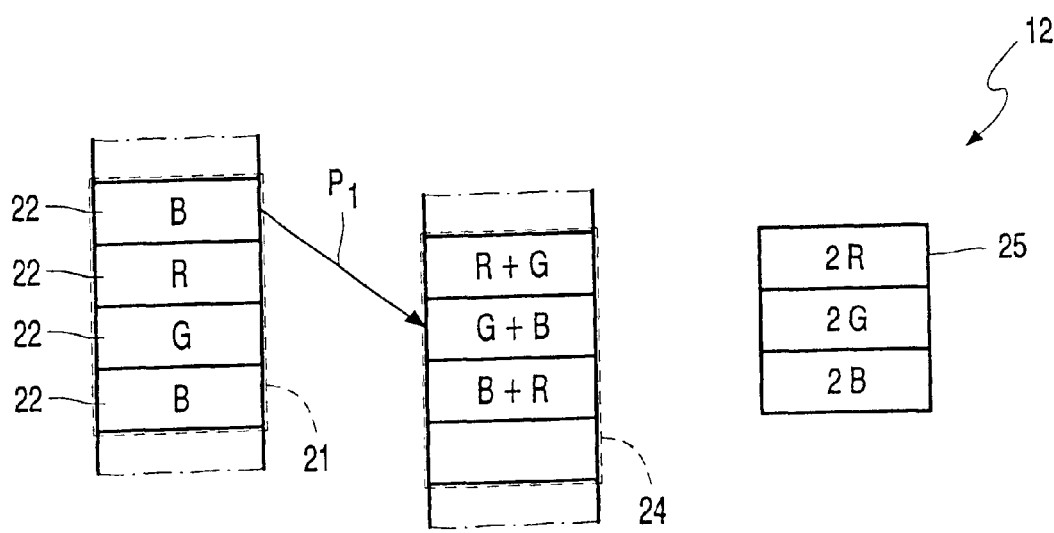

FIG. 3A shows a part of the drum provided with a plurality of bands consecutively having the colors blue B, red R and green G.

An unpolarized light beam 20 coming from the light source 2 is projected via the integrator plates 3, 4, the lens 5, the PBS 6 and the lens 7 in an area 21 on the drum 9 in which four colored bands 22 are located. In the embodiment shown in FIG. 3A, the bands 22 located in the area 21 consecutively have the colors blue B, red R, green G and blue B. The light beam 17 directed onto the bands 22 is split by each band into the light beams 18, 19, as has been elucidated with reference to FIG. 2.

This means that the blue band 22 reflects a blue light beam 18 having a direction of polarization S and that the complementary colors red and green are reflected as light beam 19 having a direction of polarization P. The light beams 18, 19 are subsequently directed via lens 7 onto the PBS 6 where the light beam 18 having the direction of polarization S is bent into the direction of lens 10 and subsequently directed via PBS 11 onto a light modulation panel 12. The light modulation panel 12 is synchronously band-controlled by information, associated with the relevant color band, about the image to be formed. The light beam 18 is reflected by means of the light modulation panel 12 and its direction of polarization is reversed and is guided as light beam 23 through the projection lens 13 and imaged on a screen (not shown).

The light beam 19 reflected by the drum 9 and having the direction of polarization P is projected by the PBS 6 on the reflecting surfaces of the integrator plate 4 via lens 5. The light beam 19 is again reflected by the reflecting surfaces into the direction of the drum 9, where the light beam 19 is directed onto an area 24 of the drum 9. With respect to the area 21, the area 24 is shifted by one band. This means that the light beam 19 reflected by the blue band B is imaged with the complementary colors red R and green G on a subjacent band 22, as is indicated by arrow P1 (see FIGS. 3A and 3B). In the embodiment shown in FIG. 3A, this band has the color red R. Consequently, the red part of the light beam 19 with the colors red R and green G will be reflected as a light beam 18 and imaged on the screen by the projection lens 13 via the light modulation panel 12 in a way as described above. The green part G of the light beam 19 will again be directed towards the second integrator plate 4. However, upon this second reflection, this green light beam reaches a lens portion located next to a reflecting surface so that it will not be reflected again towards the drum 9.

FIG. 3C shows the bands 25 ultimately imaged on the light modulation panel 12, each band being composed of a first part which is imaged directly on the light modulation panel 12 via the drum, and a second part which is reflected via the second integrator plate 4 and subsequently presented to the light modulation panel 12.

As is clearly visible from FIGS. 3A–3C, the light beam 17 is directed onto four bands 22, while in the end only three bands 25 on the light modulation panel 12 are illuminated. If the area 21 were to have the same number of bands as the light modulation panel 12, the upper band of the light modulation panel in the embodiment shown would not be provided with a light beam reflected via the second integrator plate 4 and the light modulation panel 12 would be unevenly illuminated.

In the color projection system as described in the opening paragraph of European patent application EP 99202414.1, the light beam is directed onto, for example, three bands with the colors red R, green G and blue B in an area 21 and subsequently imaged in three bands 25 on the light modulation panel 12. Each band reflects only one of the three colors, while the other two colors are absorbed. This means that only 33% of the light beam reaches the light modulation panel 12.

In the embodiment shown in FIGS. 3A–3C, four bands are illuminated, while three of them are imaged on the light modulation panel 12 and three times light beams are as yet directed onto the light modulation panel 12 via the second integrator plate 4. In this embodiment, 50% of the light beam 17 thus reaches the light modulation panel 12.

In both cases, possible losses in the different optical components have not been taken into account.

It will be evident that the bands in the area 21 are shifted by rotating the drum 9 about the centerline 8, so that the bands imaged on the light modulation panel 12 are also shifted or are scrolled.

Figures 4A, 4B, 4C:
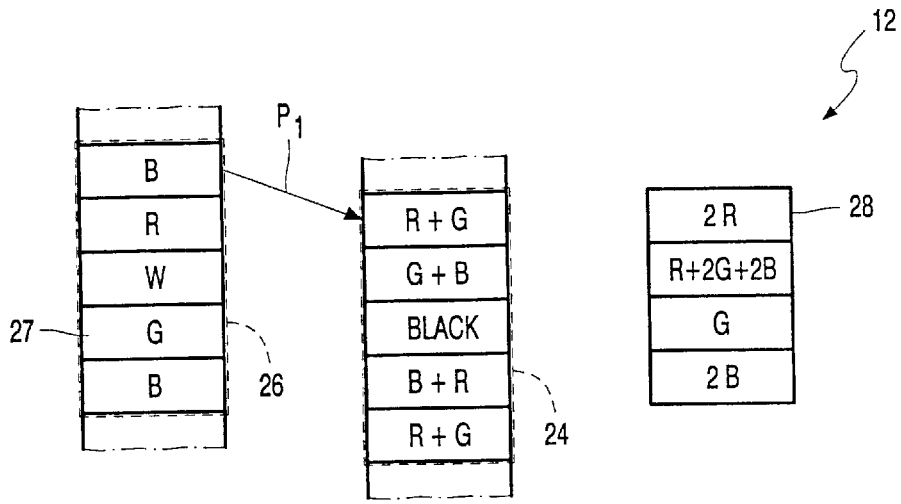
FIGS. 4A–4C show color bands directed onto the drum and the light modulation panel in a second embodiment of the drum.
Figures 5A, 5B, 5C, 5D:
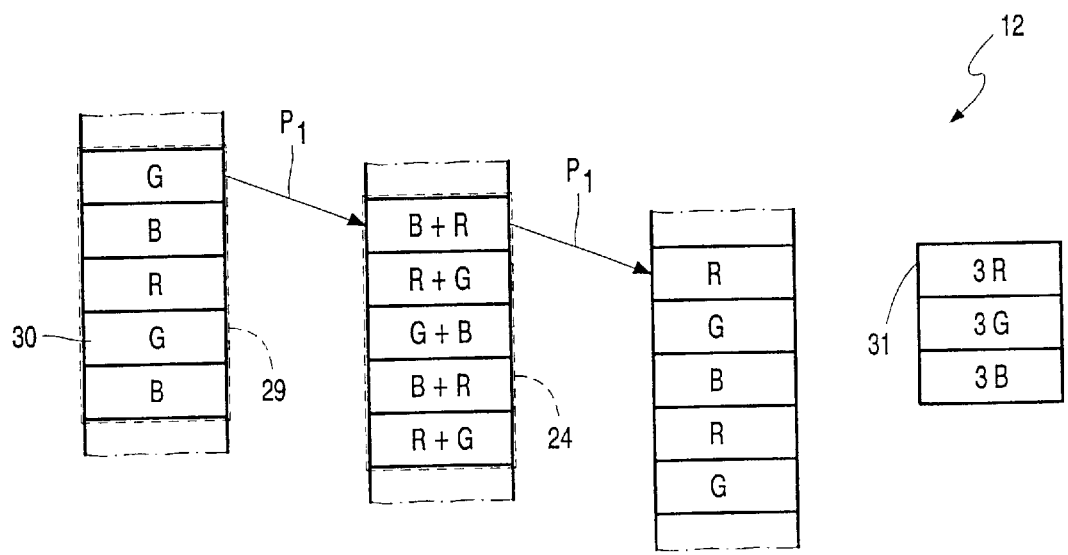
FIGS. 5A–5D show color bands directed onto the drum and the light modulation panel in a third embodiment of the drum.

FIGS. 4A–4C show a second embodiment of the drum 9, in which the light beam 20 is imaged on an area 26 of the drum 9 in which five bands 27 are located. In this embodiment, the bands consecutively have the colors blue B, red R, white W, green G. The lower four bands of these five bands are imaged as bands 28 on the light modulation panel 12. The light beams 17 incident on the bands 27 are reflected as light beams 18, 19, similarly as is the case with the bands 22. The light beam 19 reflected by the blue band B and having the complementary colors red R and green G is presented again to the subjacent red band R, whereafter the red part is directed onto the light modulation panel 12. The white band generates only a light beam 18 so that the green band located below the white band is not illuminated once more by a light beam 19.

FIG. 4C shows the illumination of the light modulation panel 12 as a result of an illumination with light beam 17 of an area 26 as shown in FIG. 4A. In the light beams imaged on the light modulation panel 12, blue B is over-represented. Consequently, a division of bands as shown in FIG. 4A is suitable if blue B should be present to a stronger degree in the ultimate illumination of the light modulation panel than the other colors, or if blue B is represented to a lesser degree in the original light beam 17 so that a better approximation of white light can be obtained in this way.

If the integrator plate 4 is provided with one lens and two associated reflecting surfaces, the light beams 19 reflected for the second time can also be presented once more to the drum 9. The area 29 (see FIGS. 5A–5C) on which light beam 17 is directed then preferably comprises two bands more than the number of bands which is imaged on the light modulation panel 12. Such an embodiment is shown in FIGS. 5A–5D, in which an area 29 comprising five bands 30 on the drum 9 is illuminated, while only three bands 31 on the light modulation panel 12 are illuminated. In this embodiment, 60% of the light beam 17 reaches the light modulation panel 12.

It is alternatively possible to image, for example, six bands on the light modulation panel 12 simultaneously, while the area which is illuminated on the drum comprises, for example, seven bands if the light beam 19 is reflected only once by the integrator plate 4. In such a case, $12/21^{st}$ part of the light beam 17 is directed onto the light modulation panel 12. It is alternatively possible to further increase the number of bands so that an even larger part of the light beam 17 will ultimately reach the light modulation panel 12. However, the control of the light modulation panel 12 simultaneously becomes more complicated because more bands are to be scrolled on the light modulation panel 12.

It is alternatively possible to pass the light from the light source 2 through a polarization conversion means so that all the light from the light source 2 is directed by the PBS 6 onto the drum 9.

What is claimed is:

1. A color projection system comprising a light source, a rotatable drum having a plurality of differently colored bands, and a light modulation panel on which light beams reflected by the colored bands can be directed by way of scrolling, characterized in that the color projection system further comprises means for directing the light beam from the light source onto a first plurality of juxtaposed bands, means for splitting and reflecting the light beam on each band into light beams having complementary colors and different directions of polarization, means for directing light beams having a first direction of polarization onto the light modulation panel, and means for reflecting light beams having a second direction of polarization onto a second plurality of bands of the drum, which second plurality of bands is shifted by at least one band with respect to the first plurality of bands.

2. A color projection system as claimed in claim 1, characterized in that the first plurality of bands comprises at least one band more than the plurality of bands imaged on the light modulation panel.

3. The color projection system of claim 2, wherein the color projection system includes means for reflecting light beams having a second direction of polarization for a second time on a third plurality of bands of the drum, which third plurality of bands is shifted by at least two bands with respect to the first plurality of bands and by at least one band with respect to the second plurality of bands.

4. The color projection system of claim 3, wherein each band on the drum is provided with a dichroic layer, a subjacent ¼λ layer and a subjacent layer reflecting white light.

5. The color projection system of claim 2, wherein each band on the drum is provided with a dichroic layer, a subjacent ¼λ layer and a subjacent layer reflecting white light.

6. The color projection system of claim 2, wherein the bands consecutively reflect the colors red, green and blue towards the light modulation panel.

7. The color projection system of claim 2, wherein at least one white band is located between two colored bands.

8. The color projection system of claim 2, wherein an integrator plate is located between the light source and the drum, which integrator plate comprises a plurality of lenses and reflecting surfaces located next to the lenses and directed towards the drum, and a polarization conversion means is provided proximate to the light source.

9. A color projection system as claimed in claim 1, characterized in that the color projection system further comprises means for reflecting light beams having a second direction of polarization for a second time on a third plurality of bands of the drum, which third plurality of bands is shifted by at least two bands with respect to the first plurality of bands and by at least one band with respect to the second plurality of bands.

10. The color projection system of claim 9, wherein each band on the drum is provided with a dichroic layer, a subjacent ¼ layer and a subjacent layer reflecting white light.

11. The color projection system of claim 9, wherein the bands consecutively reflect the colors red, green and blue towards the light modulation panel.

12. The color projection system of claim 3, wherein at least one white band is located between two colored bands.

13. The color projection system of claim 9, wherein an integrator plate is located between the light source and the drum, which integrator plate comprises a plurality of lenses and reflecting surfaces located next to the lenses and directed towards the drum.

14. A color projection system as claimed in claim 1, characterized in that each band on the drum is provided with a dichroic layer, a subjacent ¼λ layer and a subjacent layer reflecting white light.

15. The color projection system of claim 14, wherein the bands consecutively reflect the colors red, green and blue towards the light modulation panel.

16. The color projection system of claim 14, wherein at least one white band is located between two colored bands.

17. The color projection system of claim 14, wherein an integrator plate is located between the light source and the drum, which integrator plate comprises a plurality of lenses and reflecting surfaces located next to the lenses and directed towards the drum, and a polarization conversion means is provided proximate to the light source.

18. A color projection system as claimed in claim 1, characterized in that the bands consecutively reflect the colors red, green and blue towards the light modulation panel.

19. A color projection system as claimed in claim 1, characterized in that at least one white band is located between two colored bands.

20. A color projection system as claimed in claim 1, characterized in that an integrator plate is located between the light source and the drum, which integrator plate comprises a plurality of lenses and reflecting surfaces located next to the lenses and directed towards the drum.

21. A color projection system as claimed in claim 1, characterized in that a polarization conversion means is provided proximate to the light source.

* * * * *